(12) United States Patent
Liang et al.

(10) Patent No.: US 8,865,340 B2
(45) Date of Patent: Oct. 21, 2014

(54) THIN FILM BATTERY PACKAGING FORMED BY LOCALIZED HEATING

(75) Inventors: Jiuh-Ming Liang, Hacienda Heights, CA (US); Kai Wei Nieh, Monrovia, CA (US)

(73) Assignee: Front Edge Technology Inc., Baldwin Park, CA (US)

( * ) Notice: Subject to any disclaimer, the term of this patent is extended or adjusted under 35 U.S.C. 154(b) by 175 days.

(21) Appl. No.: 13/278,082

(22) Filed: Oct. 20, 2011

(65) Prior Publication Data
US 2013/0098532 A1    Apr. 25, 2013

(51) Int. Cl.
*H01M 2/00* (2006.01)
*H01M 6/00* (2006.01)

(52) U.S. Cl.
CPC ........................................ *H01M 6/00* (2013.01)
USPC ............ 429/163; 429/171; 429/175; 429/184

(58) Field of Classification Search
CPC ........... H01M 2/08; H01M 2/04; H01M 4/16; H01M 8/2475
USPC .................................. 429/163, 171, 175, 184
See application file for complete search history.

(56) References Cited

U.S. PATENT DOCUMENTS

| | | | |
|---|---|---|---|
| 3,375,135 A | 3/1968 | Moulton et al. | |
| 3,414,685 A | 12/1968 | Geib et al. | |
| 3,530,007 A | 9/1970 | Golubovic | |
| 3,844,841 A | 10/1974 | Baker | |
| 3,969,142 A | 7/1976 | Greatbatch et al. | |
| 3,993,508 A | 11/1976 | Erlichman | |
| 4,031,449 A | 6/1977 | Trombly | |
| 4,119,769 A | 10/1978 | Schneider et al. | |
| 4,233,371 A | 11/1980 | Dorrestijn | |
| 4,309,494 A | 1/1982 | Stockel | |
| 4,421,835 A | 12/1983 | Manassen et al. | |
| 4,459,328 A | 7/1984 | Mizuhara | |
| 4,543,441 A | 9/1985 | Kumada et al. | |
| 4,565,753 A | 1/1986 | Goebel et al. | |

(Continued)

FOREIGN PATENT DOCUMENTS

| | | |
|---|---|---|
| CN | 1661354 A | 8/2005 |
| EP | 0 829 913 A | 3/1998 |

(Continued)

OTHER PUBLICATIONS

Antaya et al. "Preparation and Characterization of LiCoO2 Thin Films by Laser Ablation Deposition", J. Electrochem. Soc., vol. 140, No. 3, Mar. 1993, pp. 575-578.
Fragnaud et al. "Characterization of sprayed and sputter deposited LiCoO2 thin films for rechargeable microbatteries", J. Power Sources, 63 (1996), pp. 187-191.
Birke et al. "Materials for lithium thin-film batteries for application in silicon technology", Solid State Ionics, 93 (1997), pp. 1-15.

(Continued)

*Primary Examiner* — Jane Rhee
(74) *Attorney, Agent, or Firm* — Ashok K. Janah; Janah & Associates, PC

(57) ABSTRACT

A battery packaging method comprises providing a battery comprising at least one battery cell on a substrate, the battery cell comprising a plurality of electrodes about an electrolyte, and the battery having at least one open peripheral side surface. A thermoplastic bead is provided at an open peripheral side surface of the battery. A cap is placed over the battery and in contact with the thermoplastic bead. The thermoplastic bead is locally heated by directing an energy beam onto the thermoplastic bead, the energy beam having a beam width sized sufficiently small to heat a beam incident region on the thermoplastic bead substantially without heating adjacent regions.

25 Claims, 3 Drawing Sheets

(56) References Cited

U.S. PATENT DOCUMENTS

| | | |
|---|---|---|
| 4,597,844 A | 7/1986 | Hiraki et al. |
| 4,619,865 A | 10/1986 | Keem et al. |
| 4,663,183 A | 5/1987 | Ovshinsky et al. |
| 4,698,256 A | 10/1987 | Giglia et al. |
| 4,714,660 A | 12/1987 | Gates, Jr. |
| 4,725,345 A | 2/1988 | Sakamoto et al. |
| 4,777,090 A | 10/1988 | Ovshinsky et al. |
| 4,871,433 A | 10/1989 | Wagner et al. |
| 4,873,115 A | 10/1989 | Matsumura et al. |
| 4,877,677 A | 10/1989 | Hirochi et al. |
| 4,882,212 A | 11/1989 | SingDeo et al. |
| 4,904,542 A | 2/1990 | Mroczkowski |
| 4,996,079 A | 2/1991 | Itoh |
| 5,019,467 A | 5/1991 | Fujiwara |
| 5,171,413 A | 12/1992 | Arntz et al. |
| 5,197,889 A | 3/1993 | Rizzo et al. |
| 5,240,794 A | 8/1993 | Thackeray et al. |
| 5,249,554 A | 10/1993 | Tamor et al. |
| 5,250,891 A | 10/1993 | Glasgow |
| 5,253,300 A | 10/1993 | Knapp |
| 5,254,415 A | 10/1993 | Williams et al. |
| 5,262,028 A | 11/1993 | Manley |
| 5,330,853 A | 7/1994 | Hofmann et al. |
| 5,338,625 A | 8/1994 | Bates et al. |
| 5,368,939 A | 11/1994 | Kawamura et al. |
| 5,445,906 A | 8/1995 | Hobson et al. |
| 5,478,456 A | 12/1995 | Humpal et al. |
| 5,490,911 A | 2/1996 | Makowiecki et al. |
| 5,498,490 A | 3/1996 | Brodd |
| 5,503,912 A | 4/1996 | Setoyama et al. |
| 5,506,858 A | 4/1996 | Takenaka et al. |
| 5,511,587 A | 4/1996 | Miya et al. |
| 5,512,147 A | 4/1996 | Bates et al. |
| 5,512,387 A | 4/1996 | Ovshinsky |
| 5,516,340 A | 5/1996 | Takeuchi et al. |
| 5,547,767 A | 8/1996 | Paidassi et al. |
| 5,552,242 A | 9/1996 | Ovshinsky et al. |
| 5,554,456 A | 9/1996 | Ovshinsky et al. |
| 5,561,004 A | 10/1996 | Bates et al. |
| 5,597,660 A | 1/1997 | Bates et al. |
| 5,607,789 A | 3/1997 | Treger et al. |
| 5,612,152 A | 3/1997 | Bates et al. |
| 5,629,560 A | 5/1997 | Katsui et al. |
| 5,650,243 A | 7/1997 | Ferment et al. |
| 5,656,364 A | 8/1997 | Rickerby et al. |
| 5,663,183 A | 9/1997 | Frost et al. |
| 5,670,252 A | 9/1997 | Makowiecki et al. |
| 5,670,272 A | 9/1997 | Cheu et al. |
| 5,681,666 A | 10/1997 | Treger et al. |
| 5,700,551 A | 12/1997 | Kukino et al. |
| 5,705,293 A | 1/1998 | Hobson |
| 5,705,297 A | 1/1998 | Warren |
| 5,708,297 A | 1/1998 | Clayton |
| 5,725,909 A | 3/1998 | Shaw et al. |
| 5,786,582 A | 7/1998 | Roustaei et al. |
| 5,814,195 A | 9/1998 | Lehan et al. |
| 5,818,199 A | 10/1998 | Beard |
| 5,824,374 A | 10/1998 | Bradley, Jr. et al. |
| 5,871,865 A | 2/1999 | Barker et al. |
| 5,894,656 A | 4/1999 | Menon et al. |
| 5,932,368 A | 8/1999 | Batawi et al. |
| 5,961,672 A | 10/1999 | Skotheim et al. |
| 5,981,102 A | 11/1999 | Grigg et al. |
| 5,985,485 A | 11/1999 | Ovshinsky et al. |
| 6,017,654 A | 1/2000 | Kumta et al. |
| 6,022,640 A | 2/2000 | Takada et al. |
| 6,039,850 A | 3/2000 | Schulz |
| 6,040,680 A | 3/2000 | Toya et al. |
| 6,046,575 A | 4/2000 | Demuro |
| 6,051,114 A | 4/2000 | Yao et al. |
| 6,118,248 A | 9/2000 | Gartstein et al. |
| 6,146,715 A | 11/2000 | Kim et al. |
| 6,148,503 A | 11/2000 | Delnick et al. |
| 6,168,884 B1 | 1/2001 | Neudecker et al. |
| 6,197,450 B1 | 3/2001 | Nathan et al. |
| 6,217,623 B1 | 4/2001 | Reichert et al. |
| 6,218,049 B1 | 4/2001 | Bates et al. |
| 6,220,765 B1 | 4/2001 | Tatoh |
| 6,227,204 B1 | 5/2001 | Baumann et al. |
| 6,238,847 B1 | 5/2001 | Axtell, III et al. |
| 6,242,129 B1 | 6/2001 | Johnson |
| 6,264,709 B1 | 7/2001 | Yoon et al. |
| 6,280,875 B1 | 8/2001 | Kwak et al. |
| 6,287,711 B1 | 9/2001 | Nieh et al. |
| 6,340,880 B1 | 1/2002 | Higashijima et al. |
| 6,365,010 B1 | 4/2002 | Hollars |
| 6,379,835 B1 | 4/2002 | Kucherovsky et al. |
| 6,387,039 B1 | 5/2002 | Moses |
| 6,387,563 B1 | 5/2002 | Bates |
| 6,398,824 B1 | 6/2002 | Johnson |
| 6,402,796 B1 | 6/2002 | Johnson |
| 6,411,780 B1 | 6/2002 | Maruyama |
| 6,413,645 B1 | 7/2002 | Graff et al. |
| 6,461,757 B1 | 10/2002 | Sasayama et al. |
| 6,472,295 B1 | 10/2002 | Morris et al. |
| 6,517,968 B2 | 2/2003 | Johnson |
| 6,558,836 B1 | 5/2003 | Whitacre et al. |
| 6,632,563 B1 | 10/2003 | Krasnov et al. |
| 6,636,017 B2 | 10/2003 | Zink et al. |
| 6,645,658 B2 | 11/2003 | Morozumi |
| 6,658,124 B1 | 12/2003 | Meadows |
| 6,661,197 B2 | 12/2003 | Zink et al. |
| 6,696,199 B2 | 2/2004 | Yoshida et al. |
| 6,700,766 B2 | 3/2004 | Sato |
| 6,713,987 B2 | 3/2004 | Krasnov et al. |
| 6,805,998 B2 | 10/2004 | Jenson et al. |
| 6,863,699 B1 | 3/2005 | Krasnov et al. |
| 6,866,901 B2 | 3/2005 | Burrows et al. |
| 6,916,679 B2 | 7/2005 | Snyder et al. |
| 6,921,464 B2 | 7/2005 | Krasnov et al. |
| 6,940,988 B1 | 9/2005 | Shennib et al. |
| 6,982,132 B1 | 1/2006 | Goldner et al. |
| 7,037,621 B2 | 5/2006 | Kikuchi et al. |
| 7,056,620 B2 | 6/2006 | Krasnov et al. |
| 7,122,908 B2 | 10/2006 | Jiang et al. |
| 7,157,187 B2 | 1/2007 | Jenson |
| 7,186,479 B2 | 3/2007 | Krasnov et al. |
| 7,194,801 B2 | 3/2007 | Jenson et al. |
| 7,194,901 B2 | 3/2007 | Silverbrook et al. |
| 7,276,878 B2 | 10/2007 | Phillips et al. |
| 7,286,479 B2 | 10/2007 | Bragg |
| 7,308,316 B2 | 12/2007 | Schommer |
| 7,359,590 B2 | 4/2008 | Hsu |
| 7,397,118 B2 | 7/2008 | Tominaga |
| 7,510,582 B2 | 3/2009 | Krasnov et al. |
| 7,524,577 B2 | 4/2009 | Bates |
| 7,701,176 B2 | 4/2010 | Chen |
| 7,846,579 B2 | 12/2010 | Krasnov et al. |
| 7,862,627 B2 | 1/2011 | Li et al. |
| 7,862,927 B2 | 1/2011 | Krasnov et al. |
| 8,030,898 B2 | 10/2011 | Okuto |
| 8,168,322 B2 | 5/2012 | Krasnov et al. |
| 2001/0007335 A1 | 7/2001 | Tuttle et al. |
| 2001/0041294 A1 | 11/2001 | Chu et al. |
| 2001/0052645 A1 | 12/2001 | Op'T Eynde et al. |
| 2002/0004167 A1 | 1/2002 | Jenson et al. |
| 2002/0028384 A1 | 3/2002 | Krasnov et al. |
| 2002/0041930 A1 | 4/2002 | Erdemir et al. |
| 2002/0071989 A1 | 6/2002 | Verma et al. |
| 2002/0100989 A1 | 8/2002 | Jiang et al. |
| 2002/0102400 A1 | 8/2002 | Gorokhovsky et al. |
| 2002/0110733 A1 | 8/2002 | Johnson |
| 2002/0150823 A1 | 10/2002 | Breitkopf et al. |
| 2003/0121142 A1 | 7/2003 | Kikuchi et al. |
| 2003/0143460 A1 | 7/2003 | Yoshida et al. |
| 2003/0152829 A1 | 8/2003 | Zhang et al. |
| 2003/0160589 A1 | 8/2003 | Krasnov et al. |
| 2004/0018424 A1 | 1/2004 | Zhang et al. |
| 2004/0064937 A1 | 4/2004 | Krasnov et al. |
| 2004/0086762 A1 | 5/2004 | Maeda et al. |
| 2004/0175609 A1 | 9/2004 | Yageta et al. |
| 2005/0079418 A1 | 4/2005 | Kelley et al. |
| 2005/0112461 A1 | 5/2005 | Amine et al. |
| 2005/0130032 A1 | 6/2005 | Krasnov et al. |

(56) References Cited

U.S. PATENT DOCUMENTS

| | | |
|---|---|---|
| 2005/0147877 A1 | 7/2005 | Tarnowski et al. |
| 2005/0156573 A1 | 7/2005 | Lin |
| 2005/0275370 A1 | 12/2005 | Kim |
| 2006/0027937 A1 | 2/2006 | Benson et al. |
| 2006/0040169 A1 | 2/2006 | Liu et al. |
| 2006/0040170 A1 | 2/2006 | Liu et al. |
| 2006/0060956 A1 | 3/2006 | Tanikella |
| 2006/0068258 A1 | 3/2006 | Kinoshita |
| 2006/0115706 A1 | 6/2006 | Maeda et al. |
| 2006/0134522 A1 | 6/2006 | Zhang et al. |
| 2006/0152196 A1 | 7/2006 | Matsumoto et al. |
| 2006/0216589 A1 | 9/2006 | Krasnov et al. |
| 2006/0226812 A1 | 10/2006 | Patino et al. |
| 2006/0267546 A1 | 11/2006 | Shen et al. |
| 2007/0000688 A1 | 1/2007 | Mobley |
| 2007/0037054 A1 | 2/2007 | Kikuchi et al. |
| 2007/0047750 A1 | 3/2007 | Sauer et al. |
| 2007/0047796 A1* | 3/2007 | Anantharaman .............. 382/141 |
| 2007/0104343 A1 | 5/2007 | Bengtsson et al. |
| 2007/0104344 A1 | 5/2007 | Goldberg |
| 2007/0125638 A1 | 6/2007 | Zhang et al. |
| 2007/0141460 A1 | 6/2007 | You et al. |
| 2007/0166612 A1 | 7/2007 | Krasnov et al. |
| 2007/0172739 A1 | 7/2007 | Visco et al. |
| 2007/0200258 A1 | 8/2007 | Mahler et al. |
| 2007/0297108 A1 | 12/2007 | Collins et al. |
| 2008/0003492 A1 | 1/2008 | Bates |
| 2008/0087986 A1 | 4/2008 | Tanikella |
| 2008/0191342 A1 | 8/2008 | Otremba |
| 2008/0213664 A1 | 9/2008 | Krasnov et al. |
| 2008/0217162 A1 | 9/2008 | Delrue et al. |
| 2008/0253098 A1 | 10/2008 | Liu |
| 2008/0263855 A1 | 10/2008 | Li et al. |
| 2008/0290363 A1 | 11/2008 | Lin et al. |
| 2008/0303056 A1 | 12/2008 | Ward et al. |
| 2008/0308935 A1 | 12/2008 | Kim et al. |
| 2009/0010462 A1* | 1/2009 | Ekchian et al. ................ 381/312 |
| 2009/0029500 A1 | 1/2009 | Wan |
| 2009/0039498 A1 | 2/2009 | Bayerer |
| 2009/0057136 A1 | 3/2009 | Wang et al. |
| 2009/0114429 A1 | 5/2009 | Sri-Jayantha et al. |
| 2009/0115051 A1 | 5/2009 | Leung et al. |
| 2009/0136839 A1 | 5/2009 | Kraznov et al. |
| 2009/0208671 A1 | 8/2009 | Nieh et al. |
| 2010/0028767 A1* | 2/2010 | Inose et al. ..................... 429/128 |
| 2010/0247987 A1 | 9/2010 | Holung et al. |
| 2010/0291431 A1 | 11/2010 | Shih et al. |
| 2011/0050159 A1 | 3/2011 | Nieh et al. |
| 2011/0076550 A1 | 3/2011 | Liang et al. |
| 2011/0094094 A1 | 4/2011 | Li et al. |
| 2011/0270477 A1 | 11/2011 | Ueki |
| 2012/0003520 A1 | 1/2012 | Lee et al. |
| 2012/0034502 A1 | 2/2012 | Nieh et al. |
| 2012/0080940 A1 | 4/2012 | Larsen |
| 2012/0251867 A1 | 10/2012 | Krasnov et al. |
| 2012/0268057 A1 | 10/2012 | Wu |

FOREIGN PATENT DOCUMENTS

| | | | |
|---|---|---|---|
| EP | 1 353 429 A | | 10/2003 |
| EP | 1 458 037 A | | 9/2004 |
| FR | 2 403 652 A | | 4/1979 |
| GB | 2251119 A | | 6/1992 |
| JP | 59-032023 A | | 2/1984 |
| JP | 59-226472 A | | 12/1984 |
| JP | 60-072168 | | 4/1985 |
| JP | 61195563 A | | 8/1986 |
| JP | 04-295015 | | 10/1992 |
| JP | 09-259929 A | | 10/1997 |
| JP | 2001-044073 A | | 2/2001 |
| JP | 2002-165358 | | 6/2002 |
| JP | 2002-313289 | | 10/2002 |
| JP | 2003-249199 A | | 9/2003 |
| JP | 2009123516 A | * | 6/2009 |
| WO | WO-95/14311 A | | 5/1995 |
| WO | WO-98/08672 A1 | | 3/1998 |
| WO | WO-99/23714 | | 5/1999 |
| WO | WO-99/52589 A1 | | 10/1999 |
| WO | WO-00/60689 A | | 10/2000 |
| WO | WO-01/73873 A | | 10/2001 |
| WO | WO-02/061828 A2 | | 8/2002 |
| WO | WO-02/021627 A3 | | 1/2003 |
| WO | WO-02/042516 A3 | | 1/2003 |
| WO | WO-03/061049 | | 7/2003 |
| WO | WO-03/061049 A | | 7/2003 |
| WO | WO-03/073531 A3 | | 12/2003 |
| WO | WO-03/005477 A3 | | 12/2004 |
| WO | WO-2004/111659 A2 | | 12/2004 |
| WO | WO-2006/042357 A1 | | 4/2006 |
| WO | WO-2006/105188 A1 | | 10/2006 |
| WO | WO-2006/105050 A3 | | 3/2007 |
| WO | WO-2007/042394 | | 4/2007 |
| WO | WO-2008/004851 A1 | | 1/2008 |
| WO | WO2008101254 | | 8/2008 |
| WO | WO-2008/108999 A3 | | 11/2008 |
| WO | WO-2008/134053 A1 | | 11/2008 |
| WO | WO-2009/052683 A1 | | 4/2009 |
| WO | WO-2009/073150 | | 6/2009 |

OTHER PUBLICATIONS

Benqlilou-Moudden et al. "Amorphous Lithium Cobalt and Nickel Oxides Thin Films Preparation and Characterization by RBS and PIGE", Thin Solid Films 333 (1998), pp. 16-19.

Yang et al., "Effect of annealing temperature on structure and electrochemical properties of LiCoO2 cathode thin films", Rare Metals, vol. 25, Dec. 2006, pp. 189-192.

PCT International Search Report in Application No. PCT/US2008/013213 (WO 2009/073150 A1), mailed Jun. 18, 2009.

Mattox, Donald M., Handbook of Physical Vapor Deposition (PVD) Processing, Film Formation, Adhesion, Surface Preparation and Contamination Control, 1998, pp. 127-135 and 343-364, Noyes Publications, Westwood, New Jersey, USA.

Roh et al., "Effects of deposition condition on the ionic conductivity . . . " Scripta Materialia, Dec. 17, 1999, pp. 43-49, vol. 42. No. 1, New York, NY.

Bolster et al., "Investigation of lithium intercalation metal oxides for thermalbatteries" Proceedings of the 34th Int'l Power Source Symposium, Jun. 25-28, 1990, pp. 136-140.

Liang, Jiuh-Ming, U.S. Appl. No. 13/434,775, filed Mar. 29, 2012, for Localized Heat Treatment of Battery Component Films.

Nieh et al., U.S. Appl. No. 13/627,977, filed Sep. 26, 2012, for Plasma Deposition on a Partially Formed Battery Through a Mesh Screen.

Shih et al., U.S. Appl. No. 13/626,842, filed Sep. 25, 2012, for Solid State Battery Having Mismatched Cells.

Shih et al., U.S. Appl. No. 13/333,969, filed Dec. 21, 2011, for Laminated Lithium Battery.

Nieh et al., U.S. Appl. No. 13/337,031, filed Dec. 23, 2011, for Sputtering Lithium-Containing Material With Multiple Targets.

Shih et al., U.S. Appl. No. 13/652,416, filed Oct. 15, 2012, for Lithium Battery Having Low Leakage Anode.

PCT International Search Report in Application No. PCT/US2011/046674 dated Feb. 17, 2012.

Bates et al., "Preferred orientation of polycrystalline LiCoO2 films" J. of the Electrochemical Society (2000), pp. 59-70, Issue No. 147 (1).

Wagner et al., "Fabrication and Testing of thermoelectric thin film devices" 15th Int'l Conf. on Thermoelectrics, Mar. 26-29, 1996, pp. 269-273.

Neudecker et al., "Lithium-Free Thin-Film Battery . . . " Journal of the Electrochemical Society (2000), pp. 517-523, Issue No. 147 (2).

Park et al., "Characterization of tin oxide/LiMn2O4 thin-film cell," Journal of Power Sources, Jun. 2000, pp. 250-254, vol. 88, No. 2, Elsevier Science S.A.

PCT International Preliminary Report on Patentability, Application No. PCT/US2008/013213 (WO09/073150), Mailed Jun. 10, 2010.

* cited by examiner

THIN FILM BATTERY PACKAGING FORMED BY LOCALIZED HEATING

BACKGROUND

Embodiments of the present invention relate to thin film batteries and their fabrication and packaging.

Thin film batteries are used in applications that require a small battery with a high energy density such as, for example, portable electronics, medical devices and space systems. A typical thin film battery typically comprises a substrate having one or more battery component films which cooperate to store electrical charge and generate a voltage. The battery component films include an electrolyte sandwiched between electrode films. The battery component films are thinner than conventional batteries, for example, the films can have thicknesses of less than 1000 microns, or even 100 microns. This allows thin film batteries to have thicknesses which are much smaller than the thickness of conventional batteries. The battery component films are often formed by processes such as physical and chemical vapor deposition (PVD or CVD), oxidation, nitridation, and electroplating processes. These batteries can either be used individually or stacked together to provide more power or more energy.

A polymer bead around the edge of a battery cell has been used to package thin film batteries by enclosing and sealing off the battery cells to reduce or prevent degradation of battery component films in the environment. The battery component films can chemically react with moisture, gases such as oxygen, nitrogen, carbon monoxide, and carbon dioxide, and even organic compounds and solvents present in the atmosphere. The polymer bead provides good packaging for thin film batteries as they can be shaped in a softened or viscous state at elevated temperatures to form good seals and are relatively lightweight.

However, although thermoplastic polymers can provide good oxidation resistance and can be suitable for packaging, thermoplastic materials have not been extensively used in packaging of batteries as they were found to thermally degrade during processing of the battery packaging. For example, most thermoplastics are degraded by temperatures of 100 to 120° C., which are the operating temperatures for laminating machines. Further, it is difficult to form a sealing package made from thermoplastic material around a battery without causing thermal degradation of the battery component films or other structures of the battery. This is because conventional laminator machines and related packaging methods can expose the active area of the battery cells themselves to elevated temperatures causing degradation in the quality of the battery cells, and resulting in substantial losses in open circuit voltage and degraded shelf-life of the cells.

For reasons including these and other deficiencies, and despite the development of various packaging methods for thin film batteries, further improvements in battery packaging and their methods of fabrication are continuously being sought.

SUMMARY

A battery packaging method comprises providing a battery comprising at least one battery cell on a substrate, the battery cell comprising a plurality of electrodes about an electrolyte, and the battery having at least one open peripheral side surface. A thermoplastic bead is provided at an open peripheral side surface of the battery. A cap is placed over the battery and in contact with the thermoplastic bead. The thermoplastic bead is locally heated by directing an energy beam onto the thermoplastic bead, the energy beam having a beam width sized sufficiently small to heat a beam incident region on the thermoplastic bead substantially without heating adjacent regions.

A battery manufacturing method comprises forming a battery cell on a substrate, the battery cell comprising at least a pair of electrodes about an electrolyte, and the battery having at least one open peripheral side surface. A thermoplastic bead extends along the entire length of the open peripheral side surfaces of the battery. A cap is aligned over the battery cell so that the cap covers the thermoplastic bead. The thermoplastic bead is heated with an energy beam to a sufficiently high temperature to soften and bond the thermoplastic bead to both the substrate and cap to form a seal along the perimeter of the battery.

DRAWINGS

These features, aspects, and advantages of the present invention will become better understood with regard to the following description, appended claims, and accompanying drawings, which illustrate examples of the invention. However, it is to be understood that each of the features shown in the drawings can be used in the invention in general, not merely in the context of the particular drawings, and the invention includes any combination of these features, where:

DESCRIPTION

Figure 1:
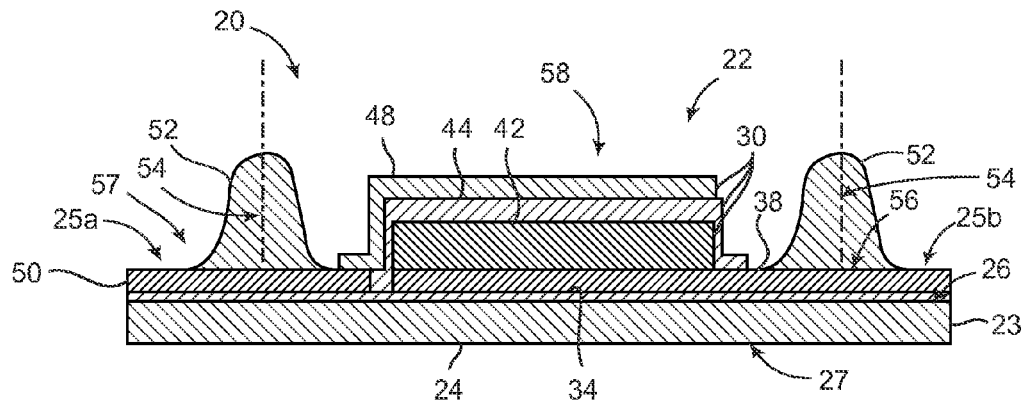
FIG. 1 is a sectional side view of an exemplary embodiment of a partially fabricated battery having a battery cell formed on a substrate and with a thermoplastic bead extending around the perimeter of the battery.

An exemplary embodiment of a thin film battery 20 comprising a battery cell 22 on a substrate 24 is shown in FIG. 1. The substrate 24 comprises a material that has low permeability to environmental gases or vapor such as water vapor, oxygen, carbon monoxide or carbon dioxide. The substrate 24 should also have a relatively smooth surface and good mechanical strength. For example, the substrate 24 can comprise aluminum, aluminum oxide, metal foil, metalized plastic film, mica, quartz, or steel. In one version, the substrate 24 comprises a plate 23 having top and bottom surfaces 26, 27 which are planar and smooth.

Figure 2:
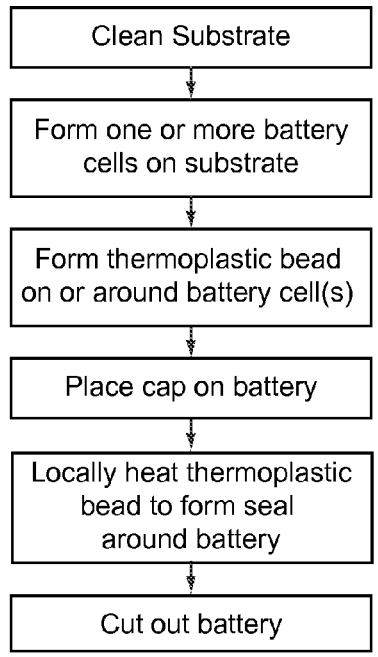
FIG. 2 is a flowchart illustrating an exemplary process of forming sealed a battery cell.

An exemplary process of fabricating a sealed battery cell 22 is illustrated in FIG. 2. While exemplary embodiments of a thin film battery 20 and process of manufacture are described, it should be understood that other battery structures and fabrication processes can also be used as would be apparent to one of ordinary skill in the art. For example, the fabrication process described herein can include processes of forming a battery cell 22 which are found in commonly assigned U.S. patent application Ser. No. 12/032,997, entitled "THIN FILM BATTERY FABRICATION USING LASER SHAPING" to Nieh et al., filed on Feb. 18, 2008; as well as U.S. Pat. Nos. 6,921,464; 6,632,563; 6,863,699, and 7,186,479; all of which are incorporated by reference herein and in their entireties.

Referring to FIG. 2, the top and bottom surfaces 26, 27 of the substrate 24 are cleaned to remove surface contaminants to obtain good adherence of deposited films. For example, the substrate 24 can be cleaned by an annealing process in which the substrate is heated to temperatures sufficiently high to clean the surface by burning-off contaminants and impurities, such as organic materials, water, dust, and other materials deposited on the surfaces 26, 27. The substrate 24 can also be heated to temperatures sufficiently high to remove any water of crystallization that maybe present in the substrate material. The annealing temperatures and/or water of crystallization removal temperatures can be, for example, from about 150 to about 600° C., or even at least about 540° C. The annealing process can be conducted in an oxygen-containing gas, such as oxygen or air, or other gas environments, for about 10 to about 120 minutes, for example, about 60 minutes.

After a suitably clean top surface 26 is obtained, a plurality of battery component films 30 are deposited on the surface 26 of the substrate 24 to form at least one battery cell 22. Each battery cell 22 has terminals 25a,b connected to a set of battery component films 30 that operate to store and generate electrical energy. In one exemplary embodiment, the battery component films 30 can include, for example, an adhesion layer 34, cathode current collector 38, cathode 42, electrolyte 44, anode 48, and anode current collector 50. The adhesion layer is deposited on the top surface 26 of the substrate 24 to improve adhesion of overlying battery component films 30. The adhesion layer 34 can comprise a metal or metal compound, such as for example, aluminum, cobalt, titanium, other metals, or their alloys or compounds thereof; or a ceramic oxide such as, for example, lithium cobalt oxide. When the adhesion layer 34 is fabricated from titanium, the titanium film is deposited in a sputtering chamber with, for example, the following sputtering process conditions: sputtering gas composed of argon at a pressure of 2 mTorr; DC (direct current) sputtering plasma at a power level of 1 kW, deposition time of 30 seconds, titanium target size of 5×20 inches, and target to substrate distance of 10 cm. The adhesion layer 34 is deposited to a thickness of from about 100 to about 1500 angstroms. To form batteries 20 on both sides of the substrate, a second adhesion layer (not shown) can be deposited on the planar bottom surface 27, and a second battery cell (also not shown) formed on the surface 27.

A cathode current collector 38 is formed on the adhesion layer 34 to collect the electrons during charge and discharge process. The cathode current collector 38 is typically a conductor and can be composed of a metal, such as aluminum, platinum, silver or gold. The current collector 38 may also comprise the same metal as the adhesion layer 34 provided in a thickness that is sufficiently high to provide the desired electrical conductivity. A suitable thickness for the current collector 38 is from about 0.05 microns to about 2 microns. In one version, the current collector 38 comprises platinum in a thickness of about 0.2 microns. The current collector 38 can be formed by deposition of platinum by DC magnetron sputtering. The sputtering conditions for depositing a platinum film from a platinum target uses sputtering gas comprising argon at a gas pressure of 5 mTorr to form a DC plasma at a power level of 40 W for 10 minutes.

A cathode 42 comprising an electrochemically active material is formed over the current collector 38. In one version, the cathode 42 is composed of lithium metal oxide, such as for example, lithium cobalt oxide, lithium nickel oxide, lithium manganese oxide, lithium iron oxide, or even lithium oxides comprising mixtures of transition metals such as for example, lithium cobalt nickel oxide. Other types of cathodes 42 that may be used include amorphous vanadium pentoxide, crystalline $V_2O_5$ or $TiS_2$. The cathode 42 can be deposited as a single film or as a stack of films, with alternate deposition and annealing steps. A cathode 42 composed of lithium cobalt oxide can be formed by alternating current (AC) or radio-frequency (RF) plasma sputtering of a target comprising lithium and cobalt in a reactive gas environment, for example oxygen gas, or by other conventional methods. Typically, the cathode 42 has a thickness of at least about 5 microns, or even at least about 10 microns. The cathode 42 can be annealed to reduce stress in the film at a temperature of from about 200 to about 500° C. The cathode 42 can also be annealed in a defect reducing step to temperatures from about 150 to about 700° C., for example, about 540° C., to further improve the quality of the cathode 42 by reducing the amount of defects.

An electrolyte 44 is formed over the cathode 42. The electrolyte 44 can be, for example, an amorphous lithium phosphorus oxynitride film, also known as a LiPON film. In one embodiment, the LiPON has the stoichiometric form $Li_xPO_yN$, in an x:y:z ratio of about 2.9:3.3:0.46. In one version, the electrolyte 44 has a thickness of from about 0.1 microns to about 5 microns. This thickness is suitably large to provide sufficiently high ionic conductivity and suitably small to reduce ionic pathways to minimize electrical resistance and reduce stress. The electrolyte 44 can be formed by RF sputtering of target material comprising lithium and phosphorous in a reactive gas environment, for example oxygen gas.

An anode 48 is formed on the electrolyte 44, and the anode 48 can be the same material as the cathode, as already described. A suitable thickness is from about 0.1 microns to about 20 microns. In one version, anode 48 is made from lithium which is also sufficiently conductive to serve as the anode current collector 50, and in this version, the anode 48 and anode current collector 50 are made of the same material. In still another version, the anode current collector 50 is deposited onto the electrolyte 44, and the anode 48 is deposited such that extends over the electrolyte 44 and onto a portion of the anode current collector 50. In this version, the anode current collector is the same material as the cathode current collector 38 to provide a conducting surface from which electrons may be dissipated or collected from the anode 48. For example, in one version, the anode current collector 50 comprises a non-reactive metal such as silver, gold, platinum, in a thickness of from about 0.05 microns to about 5 microns. In the version shown, an anode current collector 50 is selectively deposited onto the top surface of the electrolyte 44. The anode 48 is then deposited directly onto the electrolyte 44 and over a portion of the anode current collector 50. An anode 48 composed of lithium can be formed by either thermal evaporation or sputtering of target material comprising lithium.

The battery cell 22 comprising a plurality of battery component films 30, and/or the substrate 24, can also be shaped to form shaped features, for example, removing portions of the battery component films 30. The shaping processes can be performed before or the battery component films 30 are deposited on the substrate 24, for example after deposition of the cathode 42 and electrolyte 44, to shape one or both of these films, such as by etching away the edge portion or forming holes for the terminals 25a,b. Suitable shaping processes include pulsed laser, etching, another such processes, and are used to form the shapes of the battery component films 30 as illustrated in FIG. 1.

After fabrication of the one or more battery cells 22, a thermoplastic bead 52 is applied to extend across at least one of, a plurality of, or even substantially the entire length of (or all of) the open peripheral side surfaces 54 along the perimeter 56 of battery 20. The perimeter 56 of the battery confines the battery cells 22 therein. The open peripheral side surfaces 54 are those surfaces which are vertical relative to the planar top surface 26 of the substrate 24 and extend around the perimeter 56 of the battery cell 22. A portion or the entire length of the battery perimeter 56 along which extend the open peripheral side surfaces 54 are closed off by the thermoplastic bead 52. It should be understood that while the thermoplastic bead 52 is shown extending around the perimeter 56 of a battery 20 comprising a single battery cell, the thermoplastic bead 52 can enclose individual battery cells 22 of the battery 20 having more than one battery cell 22, a plurality of battery cells 22 of a multi-cell battery 20, or simply be placed around the peripheral edges 57 of the battery 20.

Figure 3:
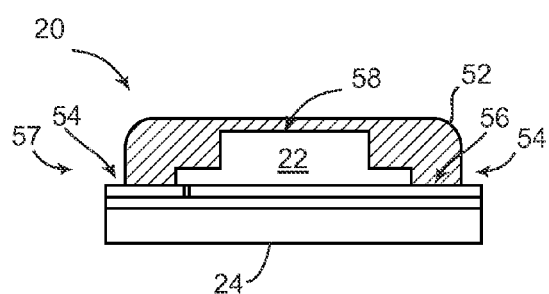
FIG. 3 is a sectional side view of an exemplary embodiment of a partially fabricated battery having a battery cell and a thermoplastic bead covering the battery cell and extending around the perimeter of the battery.

Alternatively, if the thermoplastic bead 52 is made of a sufficiently viscous and compliant material, the thermoplastic bead material can be applied to extend not just along the open peripheral side surfaces 54, but also to cover substantially the top surface 58 of the battery cells 22, as shown in FIG. 3. In this version, the thermoplastic bead 52 covers the exposed top surfaces of the battery cells 22 as well as the peripheral edges 57 of the substrate 24 which are just inside the perimeter 56 of the battery 20. In this version, the thermoplastic bead 52 encases all the battery cells 22, the top surface 58 of the battery cells 22, and a portion of the planar top surface 26 of the substrate 24. The thermoplastic bead 52 enclosing the open peripheral side surfaces 54 or covering the battery cells 22 can be a single layer or have multiple layers. In both versions, the thermoplastic bead 52 is applied to a thickness of less than 60 microns, for example, from about 20 to about 50 microns.

The thermoplastic bead 52 is composed of a thermoplastic polymer material, also known as a thermosoftening plastic. Thermoplastic polymers soften and liquefy when heated and freeze to glassy state when sufficiently cooled. Thermoplastics are high molecular weight polymers having carbon based polymeric chains associated with one another through weak Van der Waals forces (e.g. polyethylene); stronger dipole-dipole interactions and hydrogen bonding (nylon); or even stacking of aromatic rings (e.g. polystyrene). The thermoplastic material is selected to have a glass transition temperature at which it softens of from about 65° C. to about 250° C. The thermoplastic polymer material can be composed of, for example, poly(vinylidene chloride), thermoplastic polyurethanes, or mixtures thereof. A suitable poly(vinylidene chloride) comprises IXAN SGA-1™ commercially available from Solvay Advanced Polymers, Houston, Tex. A suitable thermoplastic polyurethane comprises LOCTITE U-09FL™ commercially available from Henkel Loctite Corporation, Rocky Hill, Conn. In another version, the thermoplastic bead comprises latex. A suitable latex comprises PVDC latexL817B commercially available from Asahi Kasei, Tokyo 101-8101 Japan.

Figure 4:
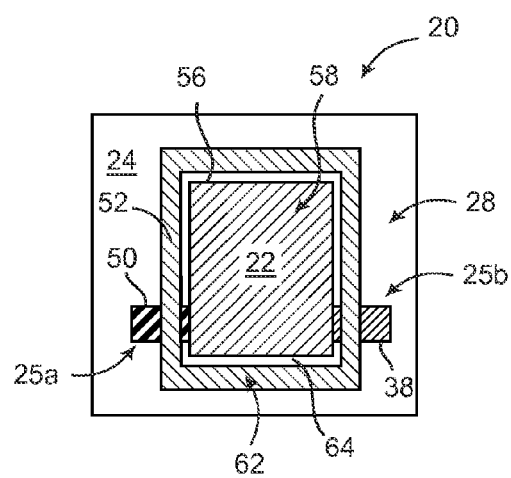
FIG. 4 is a top plan view of a battery with a thermoplastic bead extending around the peripheral side surface of a rectangular battery.

The thermoplastic bead 52 can be applied by a number of different methods, such as for example, in the forms of a bead or film, solvent soluble resin, or a liquid such as latex. The thermoplastic comprising IXAN SGA-1 is a viscous polymeric liquid at room temperature and can be applied as a thin strip that surrounds the perimeter 56 of the battery 20 or battery cell 22, as shown in FIG. 4. The thermoplastic bead 52 can also be shaped into the strip or strips by, for example, using a dispenser, screen printing, or stencil printing, which is applied to the substrate 24. The thermoplastic bead 52 can also be a prefabricated thermoplastic film that is cut in a suitable shape and applied around the battery cell 22. For example, when the battery or a battery cell 22 has a rectangle shape, the thermoplastic film can be cut in the shape of a rectangle 62 with a rectangular interior cutout 64 that is an open area which accommodates one or more battery cells 22 such that the thermoplastic bead 52 serves as an enclosure fence to enclose and surround the battery cells 22 which fit into the open area of the rectangular interior cutout 64. A portion of the cathode current collector 38 and part of the anode current collector 50 extend outside of the thermoplastic bead enclosed area to serve as the terminals 25a,b, respectively, for connecting the battery 20 or a single battery cell 22 to the external environment. As another example, when the battery cell 22 is circular in shape, a thermoplastic bead 52 comprising a circular thermoplastic bead 52 (not shown) with an circular interior cut-out, can be positioned around the battery 20 or one or more battery cells 22.

Figure 5:
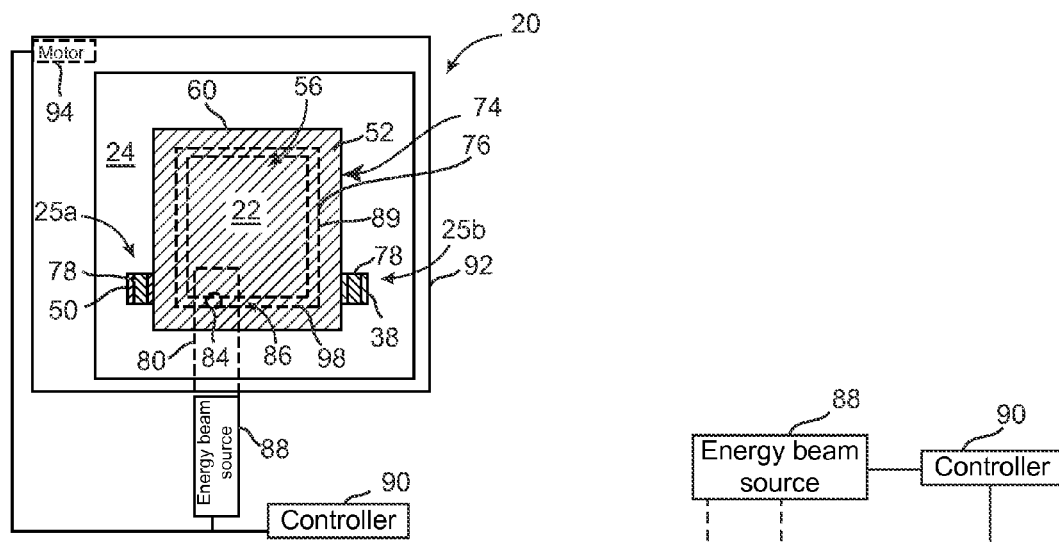
FIG. 5 shows the substrate of FIG. 4 with a cap over the battery cell and shadow masks over a portion of an anode current collector and cathode current collector that extend out from the cover.
Figure 6:
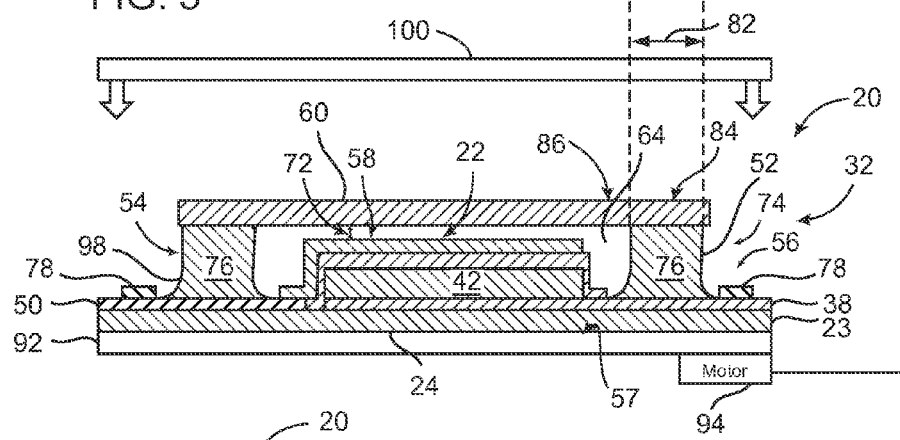
FIG. 6 is a sectional side view of a substrate having a battery cell and a cap joined to the substrate by a thermoplastic bead.

After the thermoplastic bead 52 is in place a cap 60 is aligned over the top surface(s) 58 of the one or more battery cells 22, as for example, shown in FIG. 5. In one version, the cap 60 is made from the same material as the substrate 24. For example, the substrate 24 is made of a plate 23 composed of aluminum, mica or steel, the cap 60 can also be made from the same material. However, the substrate 24 and the cap 60 can also be made from different materials, including quartz, metal foil, ceramic, and metal/polymer combinations such as metalized plastic film, or combinations of these materials. In one version, the cap 60 is shaped and sized so that the cathode current collector 38 and the anode current collector 50 extend out of the covered area to be exposed as the terminals 25a,b. Further, when placing the cap 60 over the battery 20, a gap 70 can be maintained between the cap 60 and the top surface 58 of the battery cell 22 as shown in FIG. 6. The gap distance 72 can be for example, less than 100 microns, or even from about 10 microns to about 50 microns. The cap 60 can have a thickness of less than 50 microns, for example, from about 7 to about 40 microns.

The thermoplastic bead 52 is then locally heated with an energy beam 80, as shown in FIGS. 5 and 6. The energy beam 80 has a beam width 82 sized to heat the thermoplastic bead 52 at a beam incident region 84 where the energy beam 80 is incident without heating adjacent regions 86. The energy beam 80 is maintained at a sufficiently high power level to soften and bond the thermoplastic bead 52 to at least one of the substrate 24 or cap 60. In one example, the energy beam 80 has a beam width sized less than about 1000 microns, for example, from about 500 to about 700 microns. The energy beam 80 heats the beam incident region 84 on the thermoplastic bead to a temperature of at least about 110° C. while the adjacent regions 86 are maintained at temperatures of less than about 40° C.

Typically, the energy beam 80 is positioned to be incident on the cap 60 (as shown). However, the energy beam 80 can also be positioned to be incident on the substrate 24 or even directly on the thermoplastic bead 52 from the open and exposed open peripheral side surfaces 54 of the battery 20. When the energy beam 80 is directed onto the substrate 24 or cap 60, the substrate 24 or cap 60 have to be capable of absorbing the energy provided by the energy beam without thermal fracture. In addition, it is desirable for the substrate 24 or cap 60 to transmit the energy of the energy beam without excessive absorption of the energy.

Referring to FIGS. 5 and 6, an energy beam source 88 generates the energy beam 80, which is then scanned across the entire length or area of the thermoplastic bead 52. When the thermoplastic bead 52 is provided to cover the entire top surface 58 of the battery 20 or battery cell 22, as shown in FIG. 3, the energy beam 80 is raster scanned across the area of the cap 60 or substrate 24 that lies directly above or below, respectively, the covered area of the thermoplastic bead 52. However, when the thermoplastic bead 52 is provided as a longitudinal strip that extends about the perimeter 56 of the battery 20, or around individual battery cells 22, the energy beam 80 is scanned in a pattern that matches the shape of the longitudinal strip, for example along the rectangular pattern shown in dashed lines in FIG. 5.

During heating, the energy beam 80 can be manually operated, or optionally, the energy beam source 88 can be controlled by a controller 90 which controls the power applied to the energy beam source 88 and a movable stage 92 that is capable of moving the battery 20 during heating of the thermoplastic bead 52 by the energy beam 80. The movable stage 92 can comprise a table that can be moved in the x and y directions by a stage motor 94 which can be controlled by the controller 90. The movable stage 92 and controller 90 can include interpolative program code to enable movement of the table in the x-y plane using velocity or even acceleration vectors. In one embodiment, the movable stage 92 can be set to provide different levels of vectorial velocity for example from about 0.1 to about 400 mm/s, or even from 2 mm/sec to about 10 mm/sec. In another embodiment, the vectorial acceleration of the stage can be set with levels ranging from about 0.5 to about 50 mm/sec$^2$, for example, at 0.8, 4, 20, and 40 mm/sec$^2$. In one embodiment the movable stage 92 is capable of being positioned to an accuracy of greater than about 12 microns. A low power laser (not shown) can also be used to indicate the position of the energy beam 80 on the battery 20, such as for example, a He—Ne laser. The heating and scanning process can be carried out by either moving the energy beam or sample stage.

The energy beam localized heating process can be conducted in a dry box 91 or dry room which is absent oxygen or moisture when the battery 20 includes battery component films 30 that can be oxidized, such as lithium or LIPON films. A gas nozzle 93 can also be used to blow a gas stream 95 of blowing gas onto the localized heating area 84 on the battery 20 to remove any debris or vapors from the localized heating area. The gas nozzle 93 obtains the blowing gas from a gas source 96 and the gas flow rate or pressure can be controlled by a gas flow controller 97. The blowing gas can be air, argon, nitrogen, or a mixture of such gases, and the pressure of the gas can be, for example, at least 2 Kg/cm$^3$.

In still another process version, while the thermoplastic bead 52 is locally heated by the energy beam 82, a pressure is applied to the cap 60 or substrate 24 to more securely bond the liquefied thermoplastic material to the substrate 24 or cap 60. A suitable pressure can be from about 0.1 psi to about 60 psi. The pressure can also cause the liquefied thermoplastic material to fill in microgrooves or microcracks that may be present in the substrate 24 or cap 60. For example, the battery 20 can be held down with an energy transmitting plate 100 that provides a pressure to the battery by its weight as shown or a clamp or spring device.

The energy beam 80 is directed to the thermoplastic bead 52 at a sufficiently high power level to locally heat up and soften the portion of the thermoplastic bead 52 below the beam incident region 84, to a temperature of at least the glass transition temperature of the thermoplastic material of the bead 52. The temporarily softened or liquefied thermoplastic bead 52 forms a bond with the substrate 24 and/or cap 60 as it cools to form the sealant bead 76 that serves as a sidewall 98 that joins the substrate 24 to the cap 60, as shown in FIGS. 5 and 6. The sealant bead 76 extends around the perimeter 56 or peripheral edges 57 of the battery 20, and can enclose all the battery cells 22 of the battery 20 and/or enclose individual battery cells 22. The sealant bead 76 can also extend to cover the top surface 58 of the battery cells 22 of the battery 20 as shown in FIG. 3. Thus the thermoplastic bead 52 provided as a coating covering the battery cell 22 and substrates 24, or a thermoplastic edge strip that wraps around the perimeter 56 of a battery 20 or one or more battery cells 22, seals off the open peripheral side surfaces 54 that surround the perimeter 56 of the battery cell 22 from the external environment.

In one version, the energy beam 80 comprises a laser beam 101 generated by an energy beam source 88 that is a laser beam source 103. The laser beam source 103 is selected to generate the laser beam 101 at a sufficiently high power level to soften the thermoplastic bead 52 when incident thereon. A suitable laser beam source 103 can generate a laser beam 101 having a wavelength in the ultra-violet (UV), visible, infrared (IR) or partial IR ranges, such as the carbon dioxide laser range of from about 1 to about 100 microns. The laser beam source 103 can provide a laser beam 101 that is continuous or pulsed. In the continuous beam version, the laser beam source 103 generates a continuous laser output having a steady state equilibrium. An exemplary laser beam source 103 comprises a carbon dioxide laser. An exemplary embodiment of a carbon dioxide laser provides a laser beam 101 having a wavelength of from about 10 microns to about 11 microns. A suitable carbon dioxide laser comprises a CB0805-30 available from Han's Laser, Newberg, Oreg., USA. A continuous laser beam can also be generated by an ultraviolet laser providing a laser beam 101 having a wavelength of from about 100 to about 400 nm. An exemplary ultraviolet laser comprises a Hawk-II available from Quantronix, East Setauket, N.Y.

The laser beam source 103 can also generate a laser beam 101 that is a pulsed beam. In this version, the laser beam source 103 generates a laser beam 101 comprising pulsed laser bursts which have an output energy having a series of energy spikes that may be partially overlapping or entirely separated in time. For example, in one embodiment, a laser beam 101 is programmed to provide laser beam bursts of ultraviolet light at a power level of from about 0.2 to about 1 watts, and with a duration of from about 40 to about 160 nanoseconds. These pulsed bursts can be provided at a pulse rate of from about 5 to about 200 Hz. The pulsed laser bursts can be moved across the battery substrate with a vectorial velocity of from about 0.1 to about 10 mm/s.

Figure 8:
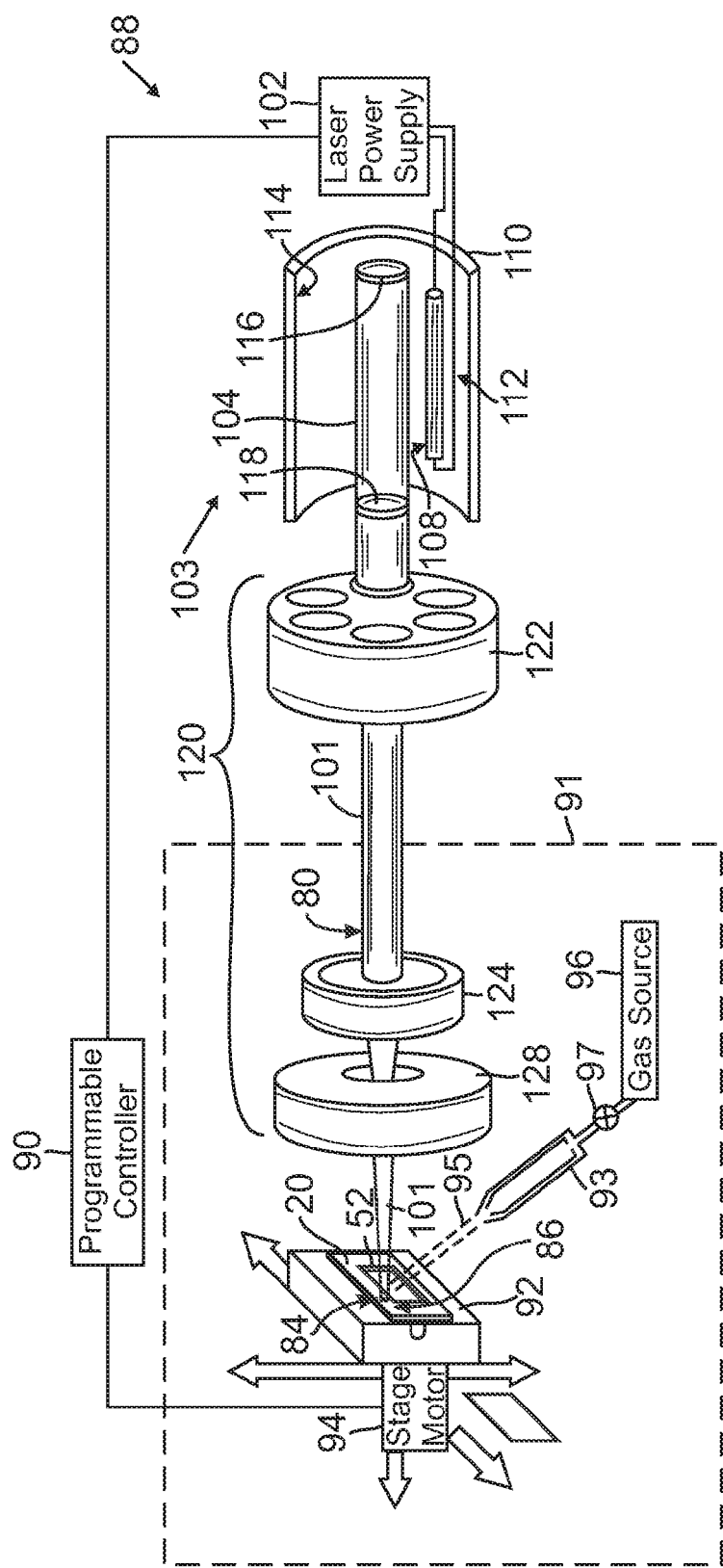
FIG. 8 is a schematic diagram of an embodiment of a laser beam apparatus for capable of locally heating the thermoplastic bead.

In the localized heating process, a laser beam source 103 is positioned above a movable stage 92 and is powered by a laser power supply 102 to generate a laser beam 101 as shown in the illustrative embodiment of FIG. 8. The laser beam is directed onto the thermoplastic bead 52 of the battery 20 to locally heat the thermoplastic bead along the beam incident region 84 without heating adjacent regions. An exemplary laser beam source 103 that can provide pulsed laser bursts comprises a lasing medium 104 and laser light source 108 positioned at the twin focal points of a light resonator 110. The lasing medium 104 can be a solid-state rod material such as a titanium doped sapphire, Nd:YAG, a chromium ion doped ruby; or a gas laser which uses a combination of an inert gas and reactive gas to generate the laser beam 101. The light resonator 110 comprises an elliptical cavity 112 having reflective surfaces 114 which reflect photons emitted from the light source toward the lasing medium 104. These photons resonate in the lasing medium 104 between a highly reflective mirror 116 and a partially reflective output coupler 118 at either end of the lasing medium 104. The generated laser beam 101 is emitted through the partially reflective output coupler 118. The composition and concentration of the lasing medium 104, and the construction of the elliptical cavity 112 of the light resonator 110, mirror 116, and coupler 118, are optimized for continuous or pulsed laser operation.

An exemplary laser beam source 103 comprises a carbon dioxide laser operated at a power level of about 30 watts in a continuous laser beam (not pulse). The laser beam is directed onto the thermoplastic beam 52 on a substrate which is placed on a movable stage 92 comprising a table that can be moved in the x and y directions by a stage motor 94 that is a synchronous or step motor, and which can operate in a grid or circular system to provide a scanning speed of from about 0.1 to about 300 mm/sec and with a repeat accuracy of about ±0.03 mm. The movable stage 92 and laser beam source 103 are operated by a controller 90 comprising a WIN2000 industrial computer with program code to enable movement of the stage 92 in the x-y plane using velocity or even acceleration vectors. A pilot laser track can be used to track and maintain the position of the laser beam on the thermoplastic bead 52. The apparatus has a 6 inch diameter vent and uses an air cooler for cooling. The apparatus operates with a power requirement of about 1.5 KW.

The continuous laser beam 101 generated by the laser beam source 103 is passed through a laser optical system 120 which comprises a neutral density filter 122, one or more focusing lenses 124, and a shutter 128. The neutral density filter 122 reduces the intensity of all wavelengths or colors equally. The focusing lens 124 can have a focal length of from about 1 cm to about 20 cm, such as for example, 10 cm. In the continuous laser beam mode, the shutter 124 is either not present or, if present, the shutter 124 is kept open to allow the laser beam 101 to pass through the open shutter without interruption. In the pulsed laser beam mode, the shutter 124 is operated to rapidly open and close. By opening and closing rapidly, the shutter 124 can generate a laser beam 101 having laser pulses with pulse durations in nanoseconds or femtoseconds. The shutter 124 can be a mechanical shutter, mode locking shutter, or electro-optical shutter.

In another version, the energy beam 80 comprises an ultrasonic energy beam generated by an energy beam source 88 that is an ultrasonic beam source. The ultrasonic beam source is selected to generate the ultrasonic energy beam at a sufficiently high power level to soften the thermoplastic bead 52 when incident thereon. A suitable ultrasonic beam source is capable of generating an ultrasonic energy beam having a frequency of from about 1 KHz to about 100 MHz. A suitable ultrasonic apparatus is 2000× Ultrasonic Assembly System. available from Branson Ultrasonics Corporation. The 20 kHz ultrasonic apparatus are rated at 1250, 2500, and 4000 Watts 30 kHz is available in 750 and 1500 Watts; and 40 kHz are available in 400 and 800 Watts. There is no warm-up time and no need for constant temperature maintenance. Unlike the RF process or heat sealing, the ultrasonic energy beam does not generate excessive heat.

In yet another version, the energy beam 80 comprises a thermal energy beam generated by an energy beam source 88 that is a thermal energy beam source. The thermal energy beam source is selected to generate the thermal energy beam at a sufficiently high power level to soften the thermoplastic bead when incident thereon. A suitable thermal energy source can generate a thermal energy beam having a thermal energy flux of from about 0.1 to about 5 $J/mm^2$. A suitable thermal energy source comprises a point thermal sealer linear thermal sealer, micro halogen light system, and micro blowtorch. The thermal energy beam provides localized heating of the beam incident region 84 without heating adjacent regions 86.

Figure 7:
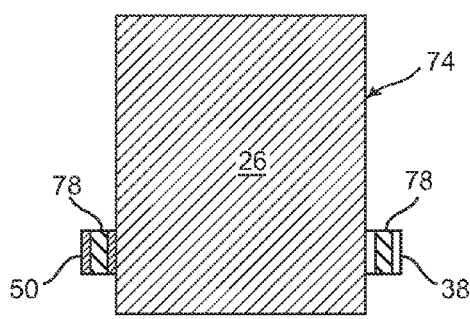
FIG. 7 is a top-plan view of a covered battery after the battery is cut from a larger, planar substrate.

After fabrication, one or more batteries 20 or battery cells 22 are cut out of the substrate 24. A suitable cutting process can include laser cutting using the previously described laser apparatus set to a higher power level or mechanical cutting. Prior to cutting, shadow masks 78 can also be used to protect portions of the battery films 30 from subsequent cutting processes that use lasers to cut and shape the films. For example, as shown in FIGS. 5 and 7, shadow masks 78 can be used to cover portions of the anode current collector 50 and the cathode current collector 38 that extend outside the protective casing 74. The shadow mask 78 can be a protective mask layer or plate or a polymer deposition mask.

Laser cutting can also be performed using a pulsed laser process. The pulsed laser process can be used to cut and shape a substrate 24 or even a structure comprising multiple stacked substrates 24. In one exemplary embodiment, the laser source is a femtosecond laser comprising a diode-pumped solid-state laser with a lasing medium comprising a rod of titanium doped sapphire. In another exemplary embodiment, the pulsed laser source is be an ultraviolet laser such as an excimer or 'excited dimer' laser, which is a chemical laser that uses a combination of an inert gas, such as argon, krypton, or xenon; and a reactive gas such as fluorine or chlorine, to generate a laser beam 101. Other laser sources can also be used, as would be apparent to one of ordinary skill. Several exemplary laser source and cutting methods are described in co-pending U.S. patent application Ser. No. 11/796,487 to Li et al. and co-pending U.S. patent application Ser. No. 12/032, 997 to Nieh et al., both of which are incorporated by reference herein and in their entireties. A battery 20 after laser cutting is shown in FIG. 7.

The localized heating process results in the substrate 24, thermoplastic bead 52, and cap 60 forming an enclosed protective casing 74 around the battery cell 22 that serves as a protective barrier that reduces or eliminates gas and moisture permeation to the battery cell 22. Further, when either or both of the substrate 24 and cap 60 comprise substrates having low permeability such as mica, or a metal and polymer composite layers, the thin sheets provide lightweight barriers to external gases and liquids even when the supporting substrate and the cover thickness is only several microns and good seals with the thermoplastic bead 52. Thus, a battery 20 comprising a substrate 24 and cap 60, and a thermoplastic bead around the edge of the interface joint between the cap and substrate can be made surprisingly environmentally resistant, thin and strong. The protective casing 74 also allows storage of the battery 20 between intermittent process steps, without excessive degradation of the battery component films 30 of the battery cell 22.

While illustrative embodiments of the thin film battery 20 are described in the present application, it should be understood that other embodiments are also possible. For example, the locally heating method and the resultant casing 74 can be applied to enclose and hermetically seal off, or contain and seal, other types of batteries, as would be apparent to those of ordinary skill in the art. Further, the exemplary methods of fabricating the batteries described herein are provided only to illustrate the present invention, and other methods may be used to fabricate the battery 20 as would be apparent to those of ordinary skill in the art. Furthermore, the materials of the battery components films 30 are also exemplary and may comprise other materials. Also, the battery 20 may have a plurality of battery cells 22 arranged in a convoluted or non-symmetrical shape depending on the application. Thus the scope of the claims should not be limited by the exemplary methods of manufacture, materials and structures provided herein.

What is claimed is:

1. A battery packaging method comprising:
   (a) depositing a plurality of battery component films on the surface of a substrate to form a battery comprising at least one battery cell, the battery cell comprising a plurality of electrodes about an electrolyte, and the battery having at least one open peripheral side surface;
   (b) providing a thermoplastic bead at an open peripheral side surface of the battery;
   (c) placing a cap over the battery and in contact with the thermoplastic bead;
   (d) locally heating the thermoplastic bead by directing an energy beam onto the thermoplastic bead, the energy beam having a beam width sized sufficiently small to heat a beam incident region on the thermoplastic bead substantially without heating adjacent regions; and
   (e) while the thermoplastic bead is heated by the energy beam, applying a pressure of from about 0.1 psi to about 60 psi to the cap or substrate to more securely bond the thermoplastic bead to the substrate or cap.

2. A method according to claim 1 wherein (d) comprises directing an energy beam having a beam width sized less than about 1000 microns.

3. A method according to claim 1 wherein (d) comprises heating the beam incident region on the thermoplastic bead to a temperature of at least about 110° C. while maintaining the adjacent regions at temperatures of less than about 40° C.

4. A method according to claim 1 wherein (d) comprises directing an energy beam at a sufficiently high power level to soften and bond the thermoplastic bead to at least one of the substrate or cap.

5. A method according to claim 1 wherein (d) comprises directing an energy beam comprising a laser beam.

6. A method according to claim 5 comprising generating the laser beam by operating a $CO_2$ laser.

7. A method according to claim 5 comprising directing a laser beam having a wavelength of from about 1 to about 100 microns.

8. A method according to claim 1 wherein (d) comprises directing an energy beam comprising an ultrasonic energy beam.

9. A method according to claim 8 comprising directing an ultrasonic energy beam having a frequency of from about 1 kHz to about 100 MHz.

10. A method according to claim 1 wherein (d) comprises directing an energy beam comprising a thermal energy beam.

11. A method according to claim 10 comprising directing a thermal energy beam having a thermal energy flux of from about 0.1 to about 5 $J/mm^2$.

12. A method according to claim 1 wherein (c) comprises placing on the battery, a cap capable of absorbing the energy provided by the energy beam without thermal fracture.

13. A method according to claim 1 wherein in (b), the thermoplastic bead comprises poly(vinylidene chloride), thermoplastic polyurethanes, or mixtures thereof.

14. A method according to claim 1 wherein in (b), the thermoplastic bead comprises latex.

15. A method according to claim 1 wherein in (b), the thermoplastic bead is provided along substantially the entire length of open peripheral side surface of the battery.

16. A method according to claim 1 wherein (e) comprises holding down the battery with an energy transmitting plate.

17. A battery manufacturing method comprising:
   (a) depositing a plurality of battery component films on the surface of a substrate to form a battery comprising at least one battery cell, the battery cell comprising at least a pair of electrodes about an electrolyte, and the battery having a perimeter;
   (b) providing a thermoplastic bead extending along the entire length of the perimeter of the battery;
   (c) aligning a cap over the battery cell so that the cap covers the thermoplastic bead;
   (d) heating the thermoplastic bead with an energy beam to a sufficiently high temperature to soften and bond the thermoplastic bead to both the substrate and cap to form a seal along the perimeter of the battery; and
   (e) while the thermoplastic bead is heated by the energy beam, applying a pressure of from about 0.1 psi to about 60 psi to the cap or substrate to more securely bond the thermoplastic bead to the substrate or cap.

18. A method according to claim 17 wherein (d) comprises:
   (i) directing an energy beam having a beam width sized less than about 1000 microns; and
   (ii) heating the beam incident region on the thermoplastic bead to a temperature of at least about 110° C. while maintaining the adjacent regions at temperatures of less than about 40° C.

19. A method according to claim 17 wherein (d) comprises heating with an energy beam comprising a laser beam.

20. A method according to claim 17 wherein (d) comprises heating with an energy beam comprising an ultrasonic energy beam.

21. A method according to claim 17 wherein (d) comprises heating with an energy beam comprising a thermal energy beam.

22. A battery packaging method comprising:
   (a) depositing a plurality of battery component films on the surface of a substrate to form a battery comprising at least one battery cell, the battery cell comprising a plurality of electrodes about an electrolyte, and the battery having at least one open peripheral side surface and an exposed top surface;
   (b) providing a thermoplastic material extending along an open peripheral side surface of the battery and covering the exposed top surface of the battery cell;
   (c) placing a cap over the battery and in contact with the thermoplastic bead;
   (d) locally heating the thermoplastic bead by directing an energy beam onto the thermoplastic bead, the energy beam having a beam width sized sufficiently small to heat a beam incident region on the thermoplastic bead substantially without heating adjacent regions; and
   (e) while the thermoplastic bead is locally heated by the energy beam, applying a pressure of from about 0.1 psi to about 60 psi to the cap or substrate to more securely bond the thermoplastic bead to the substrate or cap.

23. A method according to claim 22 comprising selecting a substrate or cap composed of any one of quartz, metal foil, ceramic, metal/polymer combinations, or combinations of these materials.

24. A method according to claim 22 wherein (a) further comprises depositing an electrolyte comprising lithium phosphorus oxynitride.

25. A method according to claim 22 wherein (a) further comprises depositing an electrode that is a cathode composed of lithium cobalt oxide, lithium nickel oxide, lithium manganese oxide, lithium iron oxide, or lithium oxide comprising a mixture of transition metals.

* * * * *